(12) United States Patent (10) Patent No.: US 12,650,827 B2
Alluboyina et al. (45) Date of Patent: Jun. 9, 2026

(54) APPLICATION DEPLOYMENT BASED ON IMAGE FINGERPRINT

(71) Applicant: Rakuten Symphony, Inc., Tokyo (JP)

(72) Inventors: Ravi Kumar Alluboyina, Santa Clara, CA (US); Prakash Vaghela, Pune (IN); Dhaval Patel, Fremont, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/043,813

(22) PCT Filed: Dec. 13, 2022

(86) PCT No.: PCT/US2022/052721
§ 371 (c)(1),
(2) Date: Mar. 2, 2023

(87) PCT Pub. No.: WO2024/129066
PCT Pub. Date: Jun. 20, 2024

(65) Prior Publication Data
US 2025/0298597 A1 Sep. 25, 2025

(51) Int. Cl.
*G06F 8/61* (2018.01)

(52) U.S. Cl.
CPC .................................... *G06F 8/63* (2013.01)

(58) Field of Classification Search
CPC ... G06F 8/63; G06F 8/76; H04L 67/10; H04L 67/56; H04L 67/565; H04L 41/0895
See application file for complete search history.

(56) References Cited

U.S. PATENT DOCUMENTS

| | | | |
|---|---|---|---|
| 7,302,609 B2 | 11/2007 | Matena | |
| 7,937,455 B2 | 5/2011 | Saha | |
| 8,122,280 B2 | 2/2012 | Ngan | |
| 8,434,090 B2 * | 4/2013 | Srinivasan | G06F 8/63 |
| | | | 718/105 |
| 8,621,453 B2 | 12/2013 | Wookey | |
| 8,887,056 B2 | 11/2014 | Breternitz | |
| 8,910,151 B2 | 12/2014 | Cui | |
| 9,075,638 B2 | 7/2015 | Barnett | |

(Continued)

FOREIGN PATENT DOCUMENTS

| | | |
|---|---|---|
| CN | 107256178 B | 12/2019 |
| CN | 106528224 B | 8/2020 |
| WO | 2021162792 | 8/2021 |

*Primary Examiner* — Marina Lee
(74) *Attorney, Agent, or Firm* — David R. Stevens; Stevens Law Group

(57) ABSTRACT

Instantiation of a deployment image is accelerated by associating images with fingerprints, including fingerprints of constituent images (e.g., container and application images) of the deployment image. A database is maintained that associates hosts with the fingerprints of images instantiated thereon. When deploying the deployment image, a host associated with at least a portion of the fingerprint of the deployment image is identified and only the portion of the deployment image that is not already present on the host are transmitted to the host. An application image may be loaded into an already-executing container. The container may be restarted and invoke an entrypoint that references an orchestrator agent that retrieves and loads the application image into the container and invokes the entrypoint of the application image.

14 Claims, 11 Drawing Sheets

(56) References Cited

U.S. PATENT DOCUMENTS

| | | | |
|---|---|---|---|
| 9,122,562 B1 | 9/2015 | Stickle | |
| 9,594,548 B2 | 3/2017 | Pena | |
| 9,703,490 B2 | 7/2017 | Xu | |
| 9,928,059 B1 | 3/2018 | Sartor | |
| 9,946,577 B1 | 4/2018 | Stafford | |
| 9,965,264 B2 | 5/2018 | Fawcett | |
| 9,973,566 B2 | 5/2018 | Hebert | |
| 10,083,025 B2 | 9/2018 | Weber | |
| 10,169,156 B2 | 1/2019 | Singh | |
| 10,198,162 B2 | 2/2019 | Wilkinson | |
| 10,223,097 B2 | 3/2019 | Weber | |
| 10,225,335 B2 | 3/2019 | Fu | |
| 10,230,786 B2 | 3/2019 | Parees | |
| 10,261,775 B1 | 4/2019 | Ramsay | |
| 10,289,398 B2 | 5/2019 | Veereshwara | |
| 10,404,474 B1 | 9/2019 | Caceres | |
| 10,462,210 B2 | 10/2019 | Mayer | |
| 10,491,533 B1 | 11/2019 | Miller | |
| 10,579,364 B2 | 3/2020 | Doshi | |
| 10,599,423 B2 * | 3/2020 | Coleman | G06F 8/63 |
| 10,740,132 B2 | 8/2020 | Goel | |
| 10,797,969 B1 | 10/2020 | Narayanasamy | |
| 10,846,137 B2 | 11/2020 | Vallala | |
| 11,163,673 B1 | 11/2021 | Meier | |
| 11,244,261 B2 | 2/2022 | To | |
| 11,271,895 B1 | 3/2022 | Vallala | |
| 11,422,862 B1 | 8/2022 | Faulhaber | |
| 11,487,530 B2 | 11/2022 | Suarez | |
| 11,550,558 B2 | 1/2023 | Bafna | |
| 11,757,999 B1 | 9/2023 | Skinner | |
| 12,039,314 B2 | 7/2024 | Mathews | |
| 12,050,701 B2 * | 7/2024 | Kounavis | G06F 9/45558 |
| 12,111,932 B2 * | 10/2024 | Gowda | G06F 21/575 |
| 12,386,801 B2 | 8/2025 | Kirmse | |
| 2004/0162807 A1 | 8/2004 | Montagne | |
| 2006/0265662 A1 | 11/2006 | Gertzen | |
| 2007/0083653 A1 | 4/2007 | Chandrasekaran | |
| 2009/0313322 A1 | 12/2009 | Sheehan | |
| 2010/0257536 A1 | 10/2010 | Srinivasan | |
| 2011/0225574 A1 | 9/2011 | Khalidi | |
| 2012/0023222 A1 | 1/2012 | Campion | |
| 2013/0124807 A1 | 5/2013 | Nielsen | |
| 2015/0046921 A1 | 2/2015 | Allen | |
| 2015/0106805 A1 | 4/2015 | Melander | |
| 2015/0355931 A1 | 12/2015 | Cropper | |
| 2016/0014191 A1 | 1/2016 | Liu | |
| 2017/0180421 A1 | 6/2017 | Shieh | |
| 2017/0220329 A1 | 8/2017 | Yang | |
| 2017/0249127 A1 | 8/2017 | Parees | |
| 2017/0249141 A1 | 8/2017 | Parees | |
| 2017/0257432 A1 | 9/2017 | Vu et al. | |
| 2017/0308330 A1 | 10/2017 | Suresh | |
| 2018/0024889 A1 | 1/2018 | Verma | |
| 2018/0129803 A1 | 5/2018 | Levin | |
| 2018/0176023 A1 | 6/2018 | Prickett | |
| 2018/0189121 A1 | 7/2018 | Jobi | |
| 2018/0189122 A1 | 7/2018 | Jobi | |
| 2018/0189176 A1 | 7/2018 | Jobi | |
| 2018/0205612 A1 | 7/2018 | Rao | |
| 2018/0336345 A1 | 11/2018 | Georgiev | |
| 2018/0349199 A1 | 12/2018 | Vyas | |
| 2019/0079788 A1 | 3/2019 | Ruty | |
| 2019/0095253 A1 | 3/2019 | Curtis | |
| 2019/0129729 A1 | 5/2019 | Peterkofsky | |
| 2019/0163405 A1 | 5/2019 | Israni | |
| 2019/0212998 A1 | 7/2019 | Vallala | |
| 2019/0213319 A1 | 7/2019 | Gerebe | |
| 2019/0215281 A1 | 7/2019 | Vallala | |
| 2019/0220297 A1 | 7/2019 | Rao | |
| 2019/0235897 A1 | 8/2019 | Goel | |
| 2019/0347121 A1 | 11/2019 | Luo | |
| 2019/0370034 A1 | 12/2019 | Goodman | |
| 2020/0034038 A1 | 1/2020 | Gokam | |
| 2020/0042392 A1 | 2/2020 | Alluboyina | |
| 2020/0167186 A1 | 5/2020 | Zhong | |
| 2020/0167234 A1 | 5/2020 | Nair | |
| 2020/0348863 A1 | 11/2020 | Venkatesan | |
| 2020/0349019 A1 | 11/2020 | Dawkins | |
| 2020/0351102 A1 | 11/2020 | Rocquelay | |
| 2020/0409680 A1 | 12/2020 | Vaddi et al. | |
| 2021/0006543 A1 | 1/2021 | Deshpande | |
| 2021/0064351 A1 | 3/2021 | Ma | |
| 2021/0064442 A1 | 3/2021 | Alluboyina | |
| 2021/0133312 A1 | 5/2021 | Sugandhi | |
| 2021/0240671 A1 | 8/2021 | Fong | |
| 2021/0279302 A1 | 9/2021 | Ya | |
| 2021/0344506 A1 | 11/2021 | Wei et al. | |
| 2022/0121741 A1 | 4/2022 | Araujo | |
| 2022/0166626 A1 | 5/2022 | Madisetti | |
| 2022/0197773 A1 | 6/2022 | Butler et al. | |
| 2022/0222105 A1 | 7/2022 | Sedayao | |
| 2022/0398187 A1 | 12/2022 | Balas | |
| 2023/0032901 A1 | 2/2023 | Tarocchi | |
| 2023/0102769 A1 | 3/2023 | Kirmse | |
| 2024/0152639 A1 | 5/2024 | Vajravel | |

* cited by examiner

Installation Fingerprint Database 300

| Host Identifier 302 | Fingerprint List 304 |
|---|---|
| Host Identifier 302 | Fingerprint List 304 |
| Host Identifier 302 | Fingerprint List 304 |
| Host Identifier 302 | Fingerprint List 304 |
| Host Identifier 302 | Fingerprint List 304 |
| Host Identifier 302 | Fingerprint List 304 |

APPLICATION DEPLOYMENT BASED ON IMAGE FINGERPRINT

BACKGROUND

Field of the Invention

This invention relates to performing application deployment based on image fingerprint.

Background of the Invention

Whether processing ecommerce transactions, streaming content, providing back-end data management for mobile applications, or other services, the modern company requires a large amount of computing resources including processor time, memory, and persistent data storage. The amount of computing resources varies over time. Modern computing installations can dynamically sale up and scale down in order to adapt to changes in usage. For example, Kubernetes is a popular orchestrator for adding and removing instances of applications based on usage. Adding an instance of an application to a host typically includes transmitting, to the host, an executable image including the application and a container for executing the application, which introduces delay.

It would be an advancement in the art to speed up the deployment of applications in a computing installation.

SUMMARY OF THE INVENTION

A computing device includes one or more processing devices and one or more memory devices operably coupled to the one or more processing devices. The one or more memory devices store executable code that, when executed by the one or more processing devices, causes the one or more processing devices to receive a request to instantiate a deployment image, the deployment image having a fingerprint associated therewith. The executable code causes the one or more processing devices to identify a host having at least a first portion of the fingerprint associated therewith, the first portion corresponding to a first portion of the deployment image. In response to identifying the host having the at least the first portion of the fingerprint associated therewith, instantiation of the deployment image on the host is invoked.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
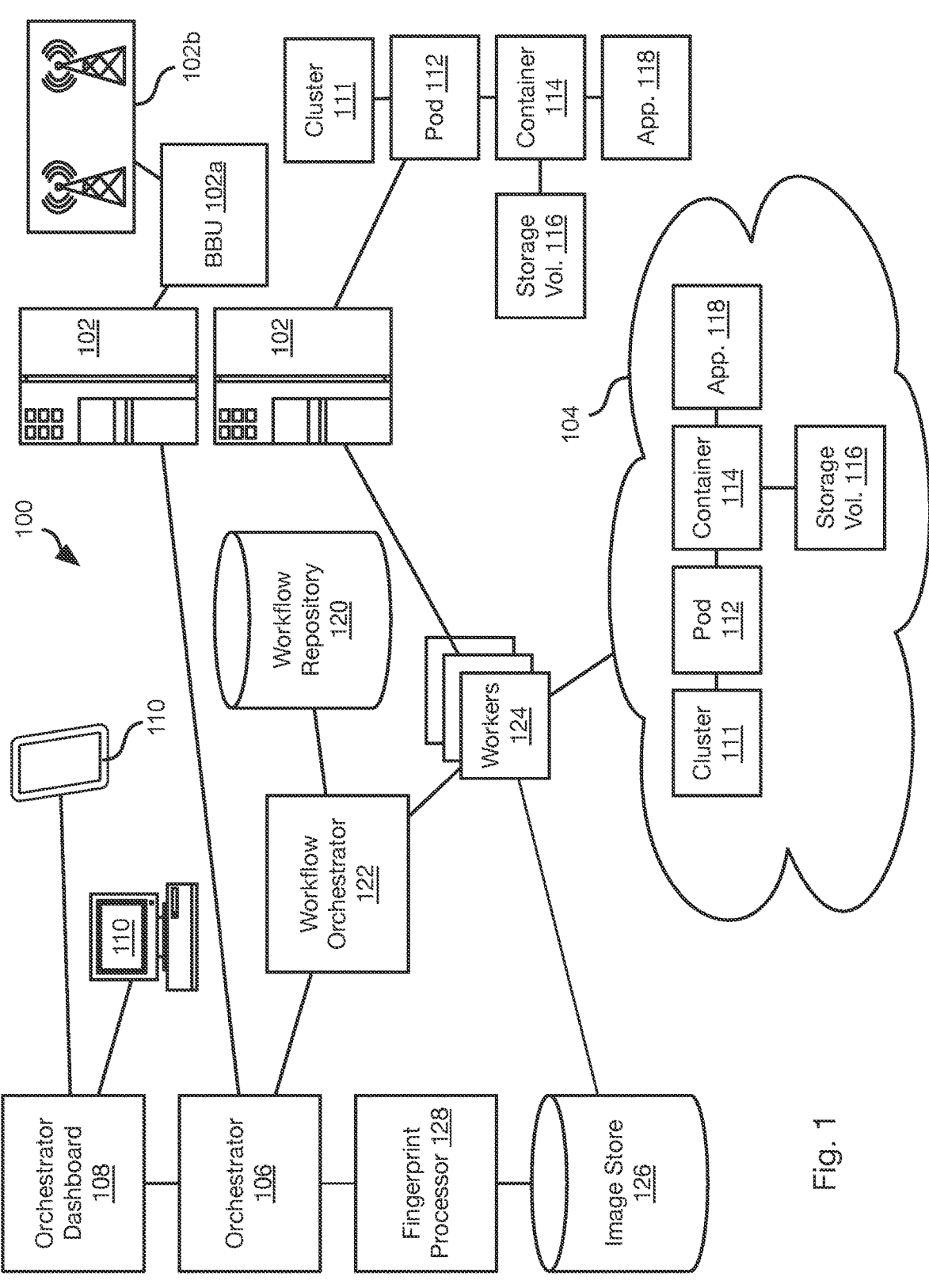
FIG. 1 is a schematic block diagram of a network environment in accordance with an embodiment.

FIG. 1 illustrates an example network environment 100 in which the systems and methods disclosed herein may be used. The components of the network environment 100 may be connected to one another by a network such as a local area network (LAN), wide area network (WAN), the Internet, a backplane of a chassis, or other type of network. The components of the network environment 100 may be connected by wired or wireless network connections.

The network environment 100 includes a plurality of servers 102. Each of the servers 102 may include one or more computing devices, such as a computing device having some or all of the attributes of the computing device 1100 of FIG. 11.

Computing resources may also be allocated within a cloud computing platform 104, such as amazon web services (AWS), GOOGLE CLOUD, AZURE, or other cloud computing platform. Cloud computing resources may include purchased physical storage, processor time, memory, and/or networking bandwidth in units designated by the provider by the cloud computing platform.

In some embodiments, some or all of the servers 102 may function as edge servers in a telecommunication network. For example, some or all of the servers 102 may be coupled to baseband units (BBU) 102a that provide translation between radio frequency signals output and received by antennas 102b and digital data transmitted and received by the servers 102. For example, each BBU 102a may perform this translation according to a cellular wireless data protocol (e.g., 4G, 5G, etc.).

An orchestrator 106 provisions computing resources to application instances of one or more different application executables, such as according to a manifest that defines requirements of computing resources for each application instance. The manifest may define dynamic requirements defining the scaling up of a number of application instances and corresponding computing resources in response to usage. The orchestrator 106 may include or cooperate with a utility such as KUBERNETES to perform dynamic scaling up and scaling down the number of application instances.

An orchestrator 106 may execute on a computer system that is distinct from the servers 102 and may be connected to the servers 102 by a network that requires the use of a destination address for communication, such as using a networking including ethernet protocol, internet protocol (IP), Fibre Channel, or other protocol, including any higher-level protocols built on the previously-mentioned protocols, such as user datagram protocol (UDP), transport control protocol (TCP), or the like.

The orchestrator 106 may cooperate with the servers 102 to initialize and configure the servers 102. For example, each server 102 may cooperate with the orchestrator 106 to obtain a gateway address to use for outbound communication and a source address assigned to the server 102 for use in inbound communication. The server 102 may cooperate with the orchestrator 106 to install an operating system on the server 102. For example, the gateway address and source address may be provided and the operating system installed using the approach described in U.S. application Ser. No. 16/903,266, filed Jun. 16, 2020 and entitled AUTOMATED INITIALIZATION OF SERVERS, which is hereby incorporated herein by reference in its entirety.

The orchestrator 106 may be accessible by way of an orchestrator dashboard 108. The orchestrator dashboard 108 may be implemented as a web server or other server-side application that is accessible by way of a browser or client application executing on a user computing device 110, such as a desktop computer, laptop computer, mobile phone, tablet computer, or other computing device.

The orchestrator 106 may cooperate with the servers 102 in order to provision computing resources of the servers 102 and instantiate components of a distributed computing system on the servers 102 and/or on the cloud computing platform 104. For example, the orchestrator 106 may ingest a manifest defining the provisioning of computing resources to and the instantiation of components such as a cluster 111, pod 112 (e.g., KUBERNETES pod), container 114 (e.g., DOCKER container), storage volume 116, and an application instance 118. The orchestrator may then allocate computing resources and instantiate the components according to the manifest.

The manifest may define requirements such as network latency requirements, affinity requirements (same node, same chassis, same rack, same data center, same cloud region, etc.), anti-affinity requirements (different node, different chassis, different rack, different data center, different cloud region, etc.), as well as minimum provisioning requirements (number of cores, amount of memory, etc.), performance or quality of service (QOS) requirements, or other constraints. The orchestrator 106 may therefore provision computing resources in order to satisfy or approximately satisfy the requirements of the manifest.

The instantiation of components and the management of the components may be implemented by means of workflows. A workflow is a series of tasks, executables, configuration, parameters, and other computing functions that are predefined and stored in a workflow repository 120. A workflow may be defined to instantiate each type of component (cluster 111, pod 112, container 114, storage volume 116, application instance, etc.), monitor the performance of each type of component, repair each type of component, upgrade each type of component, replace each type of component, copy (snapshot, backup, etc.) and restore from a copy each type of component, and other tasks. Some or all of the tasks performed by a workflow may be implemented using KUBERNETES or other utility for performing some or all of the tasks.

The orchestrator 106 may instruct a workflow orchestrator 122 to perform a task with respect to a component. In response, the workflow orchestrator 122 retrieves the workflow from the workflow repository 120 corresponding to the task (e.g., the type of task (instantiate, monitor, upgrade, replace, copy, restore, etc.) and the type of component. The workflow orchestrator 122 then selects a worker 124 from a worker pool and instructs the worker 124 to implement the workflow with respect to a server 102 or the cloud computing platform 104. The instruction from the orchestrator 106 may specify a particular server 102, cloud region or cloud provider, or other location for performing the workflow. The worker 124, which may be a container, then implements the functions of the workflow with respect to the location instructed by the orchestrator 106. In some implementations, the worker 124 may also perform the tasks of retrieving a workflow from the workflow repository 120 as instructed by the workflow orchestrator 122.

In some implementations, the containers implementing the workers 124 are remote from the servers 102 with respect to which the workers 124 implement workflows. The workers 124 may further implement some or all workflows either with or without an agent installed on the server 102 or cloud computing platform 104 that is programmed to cooperate with the workers 124 to implement the workflow. For example, the workers 124 may establish a secure command line interface (CLI) connection to the server 102 or cloud computing platform 104. For example secure shell (ssh), remote login (rlogin), or remote procedure calls (RPC), or other interface provided by the operating system of the server 102 or cloud computing platform 104 may be used to transmit instructions and verify the completion of instructions on the server 102 or cloud computing platform 104.

When instantiating a component on a host (i.e., a server 102 or a unit of computing resources on the cloud computing platform) according to a workflow, the workers 124 may retrieve an executable image for the component from an image store 126. The image store 126 may be used in cooperation with a fingerprint processor 128. As described in great detail below, the fingerprint processor 128 facilitates the reduction in the number of images that need to be transmitted to a host.

Figures 2, 3:
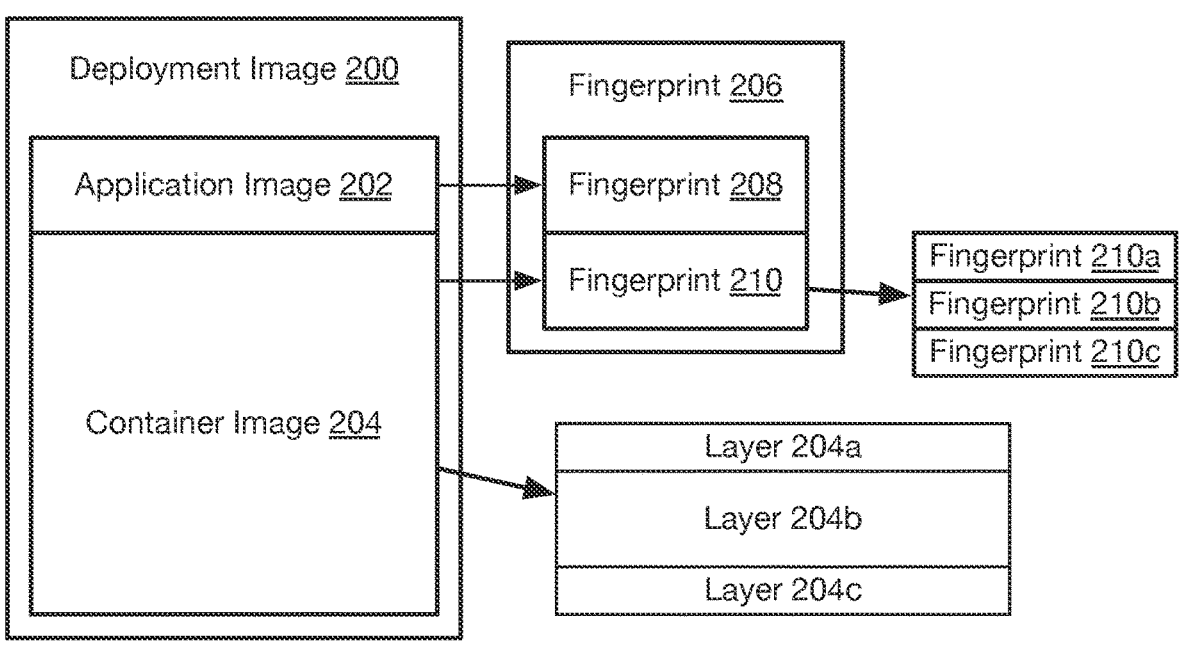
FIG. 2 is a schematic block diagram showing fingerprints of executable images in accordance with an embodiment.
FIG. 3 is a schematic block diagram showing an installation fingerprint database in accordance with an embodiment.

FIG. 2 illustrates an example deployment image 200. The deployment image 200 may include one or more constituent images. For example, a deployment image 200 for deploying an application instance 118 may include an application image 202 as well as a container image 204 for a container 114 within which the application instance 118 will executed. An application instance 118 is just one example of a component that may be instantiated from a deployment image 200. The following description references an application instance 118 with the understanding that any component 111, 112, 114, 116 may be deployed in a like manner.

The deployment image 200 may include the application image 202 and the container image 204 such that, once loaded onto a host, the deployment image 200 may commence executing as a container 114 hosting an application instance 118 corresponding to the application image 202. As used herein a "container" may be understood as software that packages all dependencies of the application image 202 so that the application will execute reliably and quickly in any given computing environment. For example, a container 114 may include executable code, runtime, system tools, system libraries, settings, and the like that enable the application image 202 to execute on a host either with or without an underlying operating system.

Each deployment image 200 may have a corresponding fingerprint 206. The fingerprint 206 may be configured in various ways. The fingerprint 206 may include a fingerprint 208 of the application image 202 and a fingerprint 210 of the container image 204. The fingerprint 206 is therefore a combination of the two fingerprints 208, 210. The fingerprints 208, 210 may be obtained by processing the images 202, 204, respectively, with a hash function or any other algorithm to generate a signature to characterize a data object. For example, a non-locality sensitive hash function may be used such that the fingerprints 208, 210 of various images of containers and applications have a high probability of being unique. The deployment fingerprint may be represented as an object with two values or a single data word in which a first range of bits, e.g., the most significant bits, correspond to the fingerprint 210 of the container image 204 and a second range of bits correspond to the fingerprint 208 of the application image 202. In this manner, a first deployment fingerprint 206 may be quickly compared to a second deployment fingerprint 206 in a bitwise operation to determine whether the first and second deployment fingerprints 206 have the same fingerprint 208, fingerprint 210, or both. In the examples below, a fingerprint 206 is described as having two constituent fingerprints 208, 210 with the understanding that a fingerprint 206 may include three or more constituent fingerprints representing different three or more components of the deployment image 200.

In some implementations, a container image 204 may include multiple layers 204a-204c. Different container images 204 may have one or more layers 204a-204c in common while one or more other layers are different. The layers 204a-204c may have different sizes. Each layer 204a-204c includes one or more of executable code, runtime, system tools, system libraries, settings, or other data such that the layers 204a-204c provide a desired execution environment for an instance of the application image 202. In such implementations, the fingerprint 210 may itself include constituent fingerprints 210a-210c that are fingerprints of the layers 204a-204c of the container image 204.

Referring to FIG. 3, an installation fingerprint database 300 may be maintained. For example, for each deployment image 200 that is instantiated on a host, an entry may be created in the installation fingerprint database 300 for an identifier 302 of that host, the entry further including a list 304 of the fingerprints 206 for each deployment image 200 instantiated on that host.

Figure 4A:
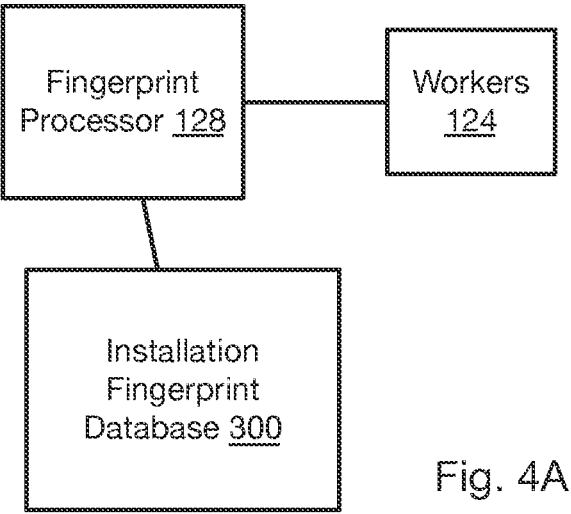
FIG. 4A is a schematic block diagram showing a first configuration for the installation fingerprint database in accordance with an embodiment.

Referring to FIG. 4A, in a first approach, the installation fingerprint database 300 is maintained and accessed by the fingerprint processor 128. Each time a worker 124 instantiates a deployment image 200 on a host, the worker 124, orchestrator 106, or some other entity, may transmit the identifier of the host and the fingerprints 206 of the deployment image to the fingerprint processor 128, which creates a corresponding entry in the installation fingerprint database 300.

Figure 4B:
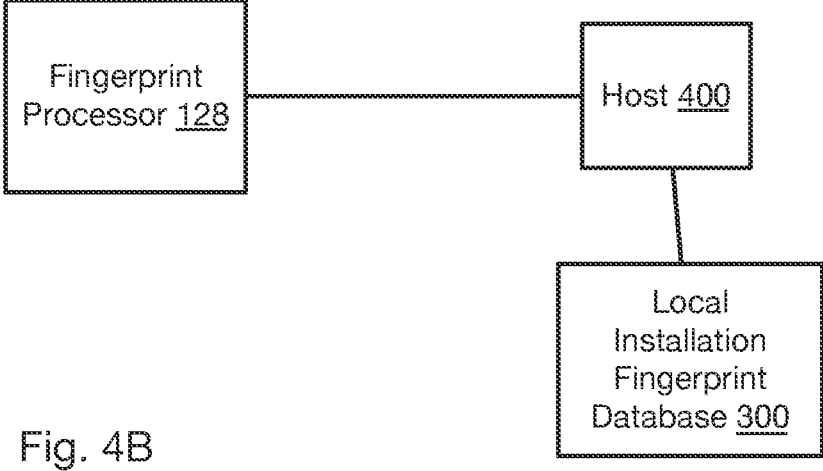
FIG. 4B is a schematic block diagram showing a second configuration with local installation fingerprint databases in accordance with an embodiment.

Referring to FIG. 4B, in a second approach a host 400 (server 102 or unit of computing resources on the cloud computing platform) maintains a local installation fingerprint database 300 that lists the fingerprints 206 for all deployment images 200 instantiated on that host 400. The fingerprint processor 128 may then query hosts 400 to determine the fingerprints 206 of each host 400.

Figure 5:
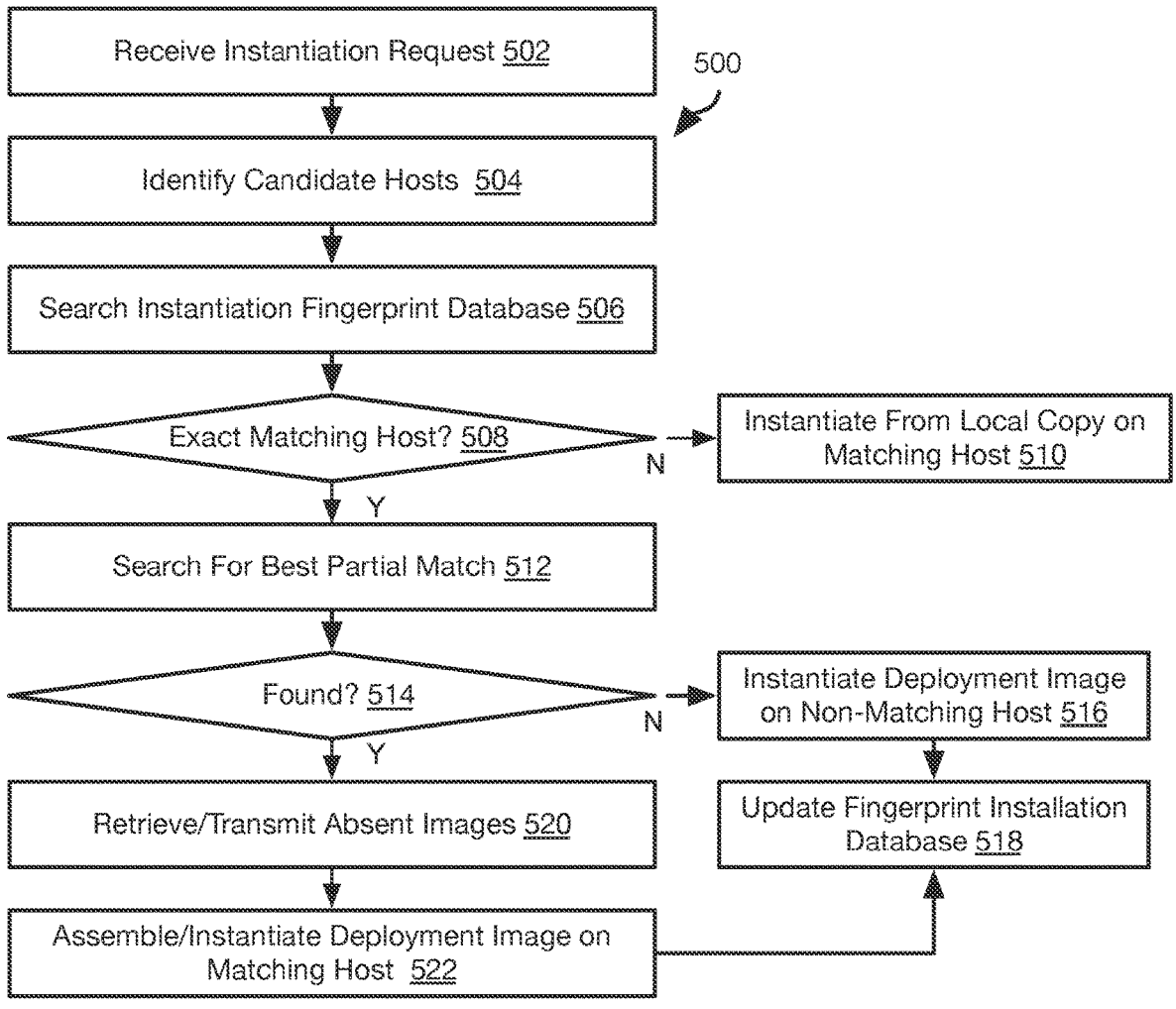
FIG. 5 is a process flow diagram of a method for accelerating the deployment of images on hosts using fingerprints in accordance with an embodiment in accordance with an embodiment.

FIG. 5 illustrates a method 500 for using fingerprints 206. In many instances, the container image 204 is much larger than the application image 202. Likewise, in many instances, the container image 204 is identical for many deployment images 200 with different application images 202. Even more likely is that one or more layers 204a-204c of a container image 204 may be identical to those of another container image 204. Accordingly, there is a high probability that at least a portion of the container image 204 of a deployment image 200 is already present on a host on which the deployment image 200 is to be instantiated. In some cases, the entire deployment image 200 is already present on a host on which the deployment image 200 is to be instantiated. The method 500 may therefore be used to accelerate the instantiation of the deployment image 200 on a host by eliminating the network delay introduced by transmitting one or both of the container image 204 and application image 202 to the host. The method 500 may be executed by the orchestrator 106, the fingerprint processor 128, a worker 124, a combination thereof, or by some other component.

The method 500 may include receiving 502 a request to instantiate a deployment image 200 ("the subject deployment image 200") and identifying 504 candidate hosts. The request to instantiate the subject deployment image 200 may be generated by the orchestrator 106 in response to instructions in a manifest ingested by the orchestrator 106. The request to instantiate the subject deployment image 200 may be generated by the orchestrator 106 or a KUBERNETES master in response to usage in order to scale up a number of application instances 118 or number of instances of some other component. Candidate hosts identified at step 504 may be identified as having sufficient hardware resources and other runtime attributes indicated in the request. An example method 600 for identifying candidate hosts is described below with respect to FIG. 6.

The method 500 may further include searching 506 the entries of the installation fingerprint database 300 (either centralized or stored locally on each candidate host) corresponding to the candidate hosts to identify any entries that include either (a) the fingerprint 206 of the entire subject deployment image 200 or (b) any of the constituent fingerprints 208, 210 of the fingerprint 206. The fingerprint 206 of the subject deployment image 200 may be included in the request or retrieved for an identifier of the subject deployment image 200 included in the request.

If a candidate host is found 508 to have an entry in the installation fingerprint database 300 that is an exact match of the fingerprint 206 of the subject deployment image 200, then the deployment image 200 is instantiated 510 from the copy of the deployment image 200 on that candidate host (e.g., stored in the memory or persistent storage of that candidate host).

If no entries including the host identifiers 302 of the candidate hosts are found 508 to include the exact fingerprint 206, the method 500 may include searching 512 the installation fingerprint database 300 for an entry referencing a candidate host that is a partial match including any of the constituent fingerprints 208, 210, 210a-210c of the subject deployment image 200. Note that there may be multiple containers on a given candidate host such that one layer 210a may be part of a first container image instantiated on a candidate host whereas another layer 210b may be part of a second container image instantiated on the candidate host. Accordingly, different fingerprints 206 associated with a candidate host in the installation fingerprint database 300 may match different constituent fingerprints 208, 210, 210a-210c of the fingerprint 206 of the subject deployment image 200. As noted above, the layers 204a-204c may have different sizes. Likewise, the number of layers 204a-204c present on any given candidate host may vary. Accordingly, step 512 may include searching for the best partial match: the candidate host having the greatest amount of data from the deployment image 200. For example, a candidate host that has the largest layer 204*b* may be a better choice than a host with more layers 204*a*, 204*c* having a total size less than the largest layer 204*c*.

If a partial match is not found 514, the method 500 may include instantiating 516 the subject deployment image 200 on a non-matching host of the candidate hosts by transmitting the entire subject deployment image 200 to the non-matching host and instantiating the subject deployment image 200 on the non-matching host. Transmitting the entire subject deployment image 200 to the candidate host may include transmitting the entire subject deployment image 200 to the candidate host over a network, which introduces a network delay. The method 500 may further include updating 518 the installation fingerprint database 300 to include an entry associating the candidate host with the fingerprint 206, including all constituent fingerprints 208, 210, 210*a*-210*c* of the fingerprint 206.

If one or more entries including the host identifiers 302 of the candidate hosts are found 514 to include any of the constituent fingerprints 208, 210, 210*a*-210*c* of the subject deployment image 200, the method 500 may include retrieving 520 any images that are absent from a selected host of the candidate hosts and transmitting the absent images to the selected host. The selected host may be the candidate host identified as the best partial match at step 512. The images that are absent may include those portions of the deployment image 200 for which corresponding fingerprints 208, 210, 210*a*-210*c* are absent from the fingerprints 206 associated with the selected host in the installation fingerprint database 300. The images that are already present on the selected host and the absent images transmitted at step 520 may then be assembled 522 to form the deployment image 200 and the deployment image may then be instantiated on the selected host. Assembling 522 may include arranging the images of the subject deployment image 200 in memory or persistent storage in a correct order in order to function as if the entire subject deployment image 200 was transmitted to the selected host. Instantiation at step 522 may be preceded by or followed by any steps required to configure the instance of the deployment image 200 to function, including configuring the instances of the application image 202 and the container image 204 with unique identifiers and/or addresses to be distinguished from other instances of the deployment image 200.

The installation fingerprint database 300 may also be updated 518 such that the entry for the selected host includes the fingerprints 208, 210, and/or 210*a*-210*c* of the formerly absent images. For example, the fingerprint 206 of the deployment image may be added to the entry for the selected host, which includes the constituent fingerprints 208, 210, 210*a*-210*c*.

Figure 6:
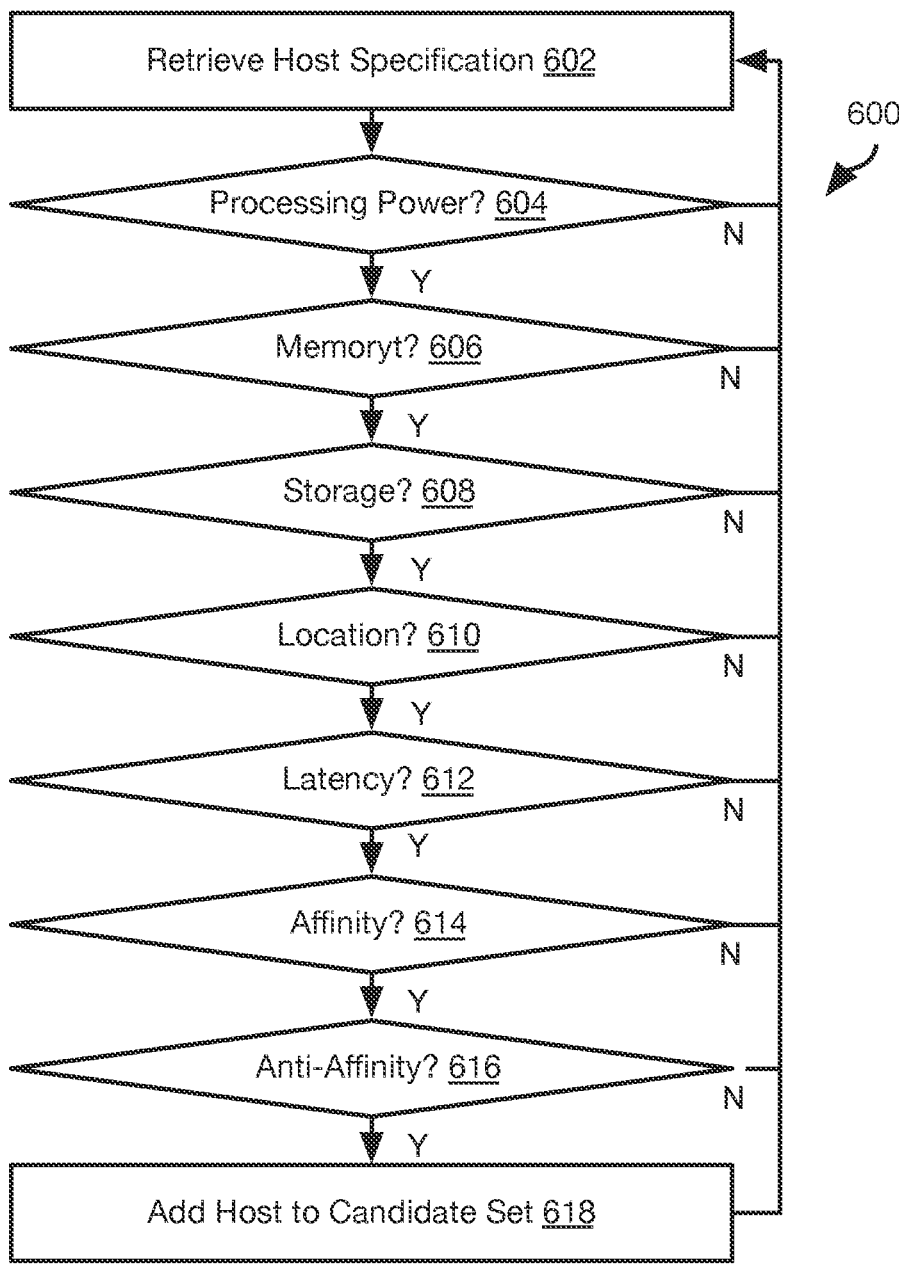
FIG. 6 is a process flow diagram of a method for identifying candidate hosts in accordance with an embodiment.
Figure 7:
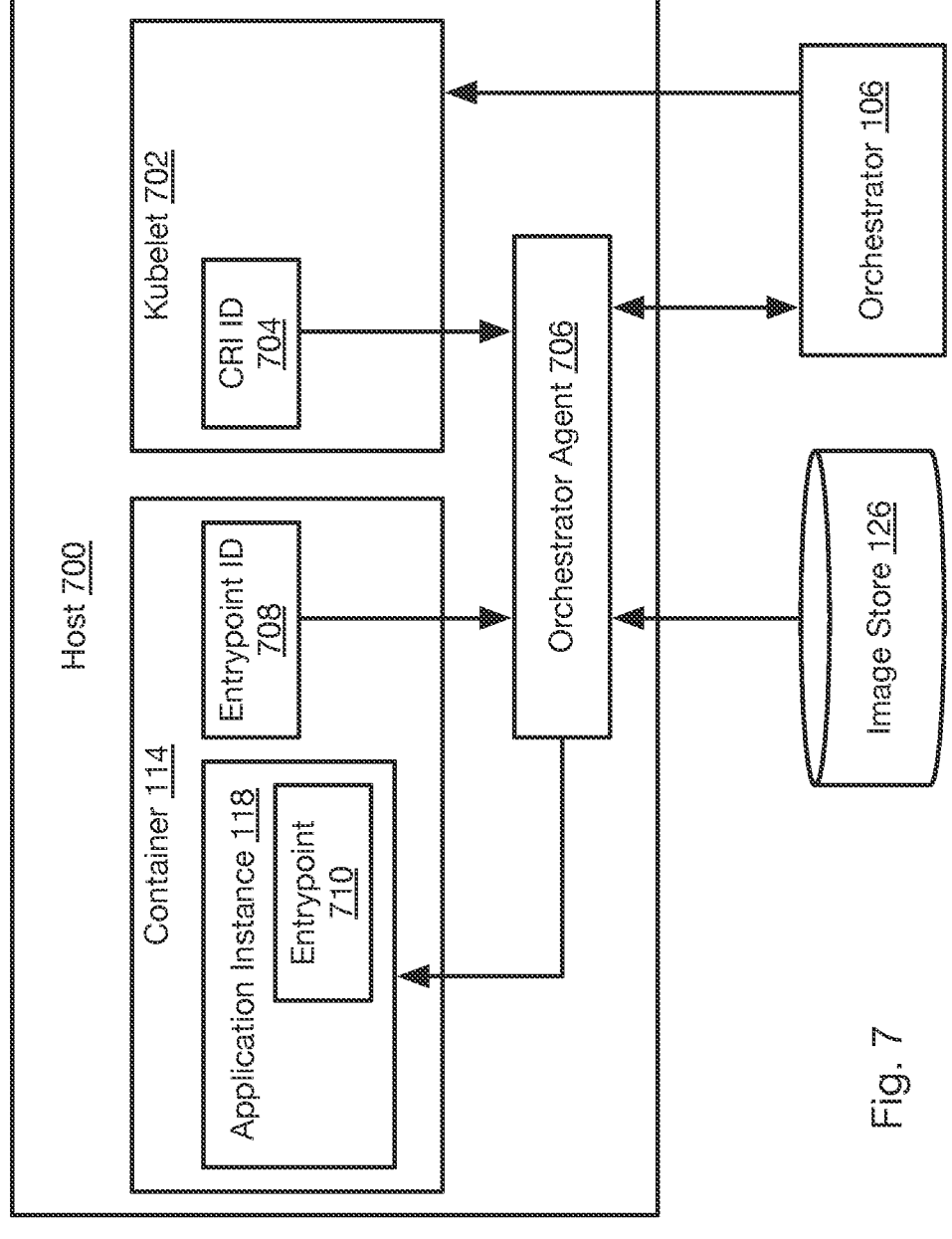
FIG. 7 is a schematic block diagrams of components used to deploy container and application images on a host in accordance with an embodiment.

FIG. 6 illustrates a method 600 for identifying 504 candidate hosts. The method 500 may include processing each host of a plurality of hosts as "the subject host." Once all hosts of the plurality of hosts are processed the method 600 may end. The method 600 may also end as soon as at least one candidate host is identified. The method 600 and step 508 may be performed in an inverted order: candidate hosts may be identified as having at least a portion of the subject deployment image 200 may be identified first followed by filtering out any of the candidate hosts that do not meet the criteria of the method 600 for candidate hosts.

Each host may have a corresponding host specification that defines attributes of the host such as hardware attributes including number of processing cores, amount of memory, amount of persistent storage. The attributes of a host may further include runtime attributes such as a geographic or network location, latency with respect to one or more other hosts, or other runtime attributes. The hardware attributes may further indicate how much of the processing power (e.g., number of cores), memory, and persistent storage of the subject host is available for allocation (i.e., has not already been allocated to another component or for use by an operating system).

The deployment image 200 may have a corresponding deployment specification specifying hardware requirements (amount of processing power (e.g., number of cores), amount of memory, and amount of persistent storage) and other runtime requirements as discussed below. The deployment specification may be derived from the manifest ingested by the orchestrator 106.

The method 600 may include retrieving 602 the specification for the subject host and evaluating 604 whether the subject host has sufficient available processing power to meet the hardware requirements of the deployment specification. The method 600 may include evaluating 606 whether the subject host has sufficient memory to meet the hardware requirements of the deployment specification. The method 600 may include evaluating 608 whether the subject host has sufficient persistent storage to meet the hardware requirements of the deployment specification.

The method 600 may include evaluating 610 whether the location of the subject host matches or is within a threshold distance of a location specified in the deployment specification. The method 600 may include evaluating 612 whether latency of the subject host relative to one or more other hosts is below a maximum latency specified in the deployment specification.

The method 600 may include evaluating 614 whether placing the subject deployment image 200 on the subject host would violate an affinity rule in the deployment specification. In order to function adequately, some components may be required to have a certain degree of affinity relative to other components: same device, same rack, same data center, same region, etc. Accordingly, step 614 may include evaluating whether the subject host has the required degree of affinity with respect to another component, e.g., cluster 111, pod 112, container 114, storage volume 116, or application instance 118.

The method 600 may include evaluating 616 whether placing the subject deployment image 200 on the subject host would violate an anti-affinity rule in the deployment specification. In order to provide a required degree of redundancy, some components may be required to have a certain degree of anti-affinity, e.g., separation, relative to other components: different device, different rack, different data center, different region, etc. Accordingly, step 616 may include evaluating whether the subject host has the required degree of anti-affinity with respect to another component, e.g., cluster 111, pod 112, container 114, storage volume 116, or application instance 118.

If the conditions of all of 604-616 are met, then the subject host is added 618 to a set of candidate hosts. If not, then the subject host may be excluded from the set of candidate hosts.

Referring to FIGS. 7-10B, in some scenarios, a container 114 is currently installed and executing on a host 700 and the application instance 118 executing within the container 114 must be replaced. The application instance 118 may need to be replaced in order to upgrade the application instance 118 to a new version. The application instance 118 may be de-instantiated due to a need to scale down the number of application instances 118 or other cause and the container 114 may be maintained available to be reused.

Reuse of a container 114 reduces the network delay required to transmit a new container image 204 and the time required to instantiate and start up the container 114. Reusing containers 114 may be performed in cooperation with the orchestrator 106 or some other component performing the functions ascribed to the orchestrator 106 in the description below.

Instantiation of containers 114 on a host 700 may be managed by a Kubelet 702 according to KUBERNETES. The Kubelet 702 may call a container runtime interface (CRI) when instantiating a container. The Kubelet 702 may be configured with a CRI identifier 704 that refers to an orchestrator agent 706 executing on the host 700. The orchestrator agent 706 may be configured to perform tasks required to instantiate the container 114 and also be configured to communicate with the orchestrator 106 in order to perform other actions outside of KUBERNETES as described below.

When a container 114 first begins execution, the container 114 will call an entry point of an application instance 118 hosted by the container 114. In some embodiments, the container 114 is configured with an entrypoint identifier 708 (e.g., pointer) that refers to the orchestrator agent 706 or other agent of the orchestrator 106. The orchestrator agent 706 may perform actions outside of KUBERNETES in order to configure the container 114 and then invoke the actual entrypoint 710 of the application instance 118 within the container 114.

As described in greater detail below, when the container 114 is restarted and uses the entrypoint identifier 708 to invokes the orchestrator agent 706, the orchestrator agent 706 may then retrieve a new application image 202 from the mage store, configure the container the new application image 202 as the application instance 118 hosted by the container 114, and then invoke the entrypoint 710 of the application instance 118. The container 114 is therefore enabled to transition from executing a former application instance 118 to a new application instance without the need to re-instantiate the container 114 or download the container image 204 for the container 114.

Figure 8:
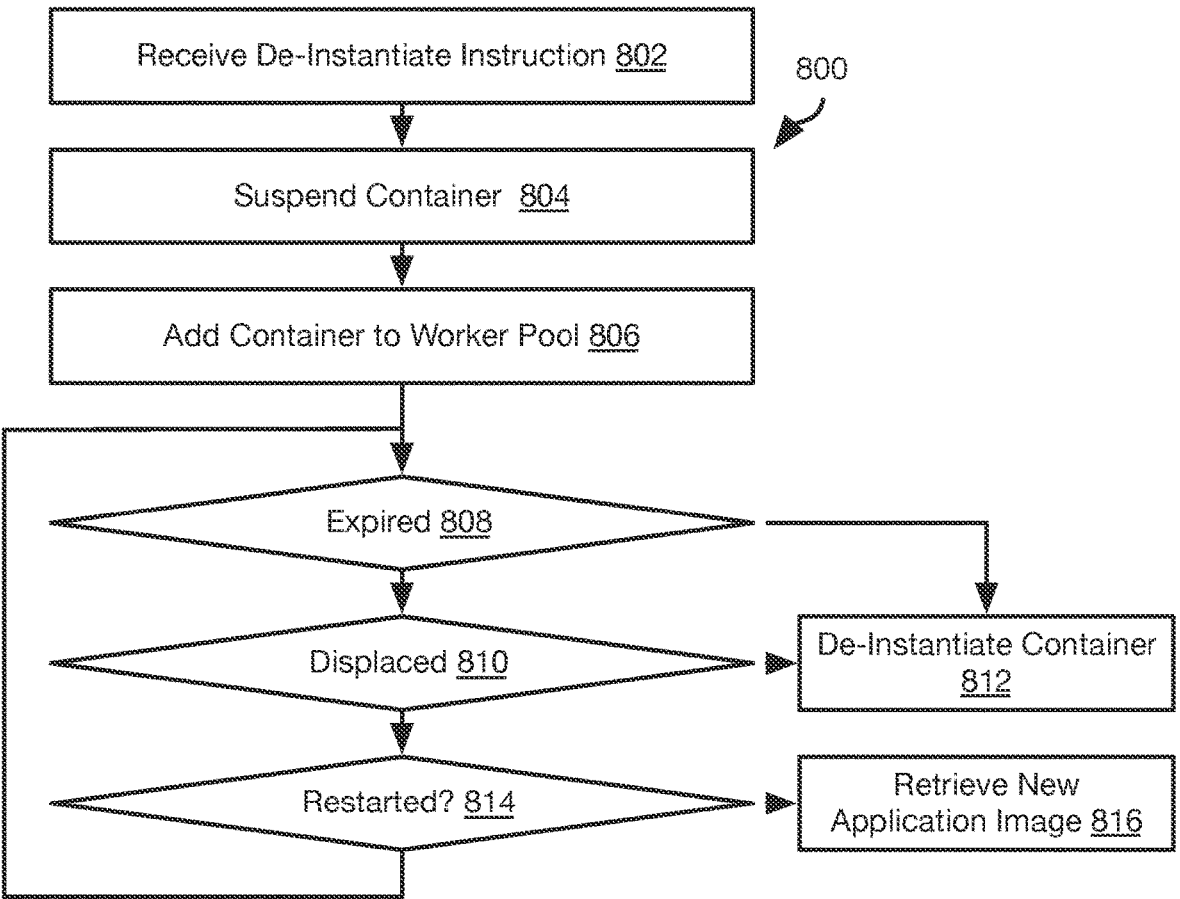
FIG. 8 is a process flow diagram of a method for reusing containers in accordance with an embodiment.

FIG. 8 illustrates a method 800 for reusing a container 114. The method 800 may be executed by the orchestrator 106, or some other component, in cooperation with the orchestrator agent 706 executing on the host 700.

The method 800 may include receiving 802, by the orchestrator agent 706, an instruction to de-instantiate the application instance 118 hosted by the container 114. The instruction may be sent by the orchestrator 106, a KUBERNETES master, or some other component. As the CRI for the container 114, the orchestrator agent 706 may then suspend 804 execution of the container 114. The orchestrator agent 706 and/or the orchestrator 106 may then add 806 a reference to the container 114 (e.g., an entry including an identifier of the host 700 and an identifier of the container 114, such as a fingerprint 210 of the container 114) to a worker pool. The worker pool may be local to the host or may be centralized and include references to available containers on multiple hosts. The worker pool for containers 114 available for reuse may be the same as or different from the worker pool including workers 124 for implementing workflows.

Containers 114 that go unused for a predetermined period of time may be found 808 to be expired. Likewise, a container may be found 810 to be displaced where memory storing the container 114 is needed for a different container 114. In either case, the container may then be de-instantiated 812 and references to the container 114 may be removed from the worker pool.

If the container 114 is found 814 to be restarted, and invokes the orchestrator agent 706 as an entrypoint, the orchestrator agent 706 may then retrieve 816 a new application image as directed by the orchestrator 106 and configured the container 114 to execute an application instance 118 of the new application image.

Figure 9:
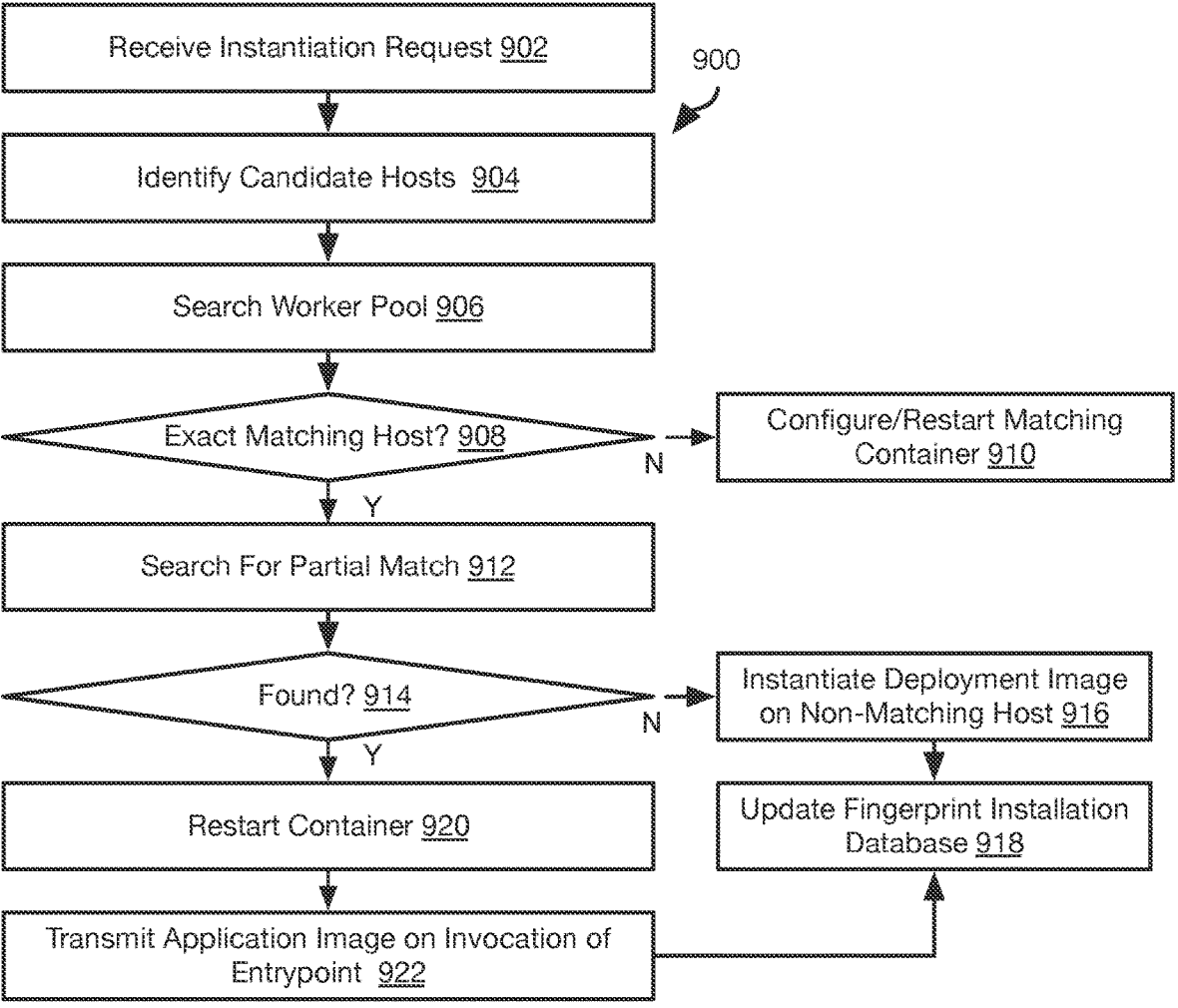
FIG. 9 is a process flow diagram of a method for selecting an existing container for instantiating an image in accordance with an embodiment.

FIG. 9 illustrates a method 900 for using existing containers 114 in a worker pool. The method 900 may be executed by the orchestrator 106, the fingerprint processor 128, a worker 124, a combination thereof, or by some other component.

The method 900 may include receiving 902 a request to instantiate a deployment image 200 ("the subject deployment image 200") and identifying 904 candidate hosts. The request to instantiate the subject deployment image 200 may be generated by the orchestrator 106 in response to instructions in a manifest ingested by the orchestrator 106. The request to instantiate the subject deployment image 200 may be generated by the orchestrator 106 or a KUBERNETES master in response to usage in order to scale up a number of application instances 118 or number of instances of some other component. Candidate hosts identified at step 904 may be identified as having sufficient hardware resources and other runtime attributes indicated in the request. Candidate hosts may be identified using the method 600 of FIG. 6.

The method 900 may further include searching 906 the worker pool to identify any matching entries. Searching 906 may include searching the installation fingerprint database 300 to identify matching hosts followed by identifying a subset of the matching hosts with matching containers in the worker pool. A matching entry in the installation fingerprint database 300 and/or worker pool may be one that references both of (a) an identifier of any of the candidate host and (b) the fingerprint 210 of the container image 204 of the subject deployment image 200. Note that there may be multiple tables used such that multiple entries establish the association between the fingerprint 210 and a container 114 executing on a candidate host.

If a candidate host is found 908 to have a container 114 in the worker pool that already hosts an application instance 118 corresponding to the application image 202 of the deployment image 200, i.e., an exact match of the fingerprint 206 of the subject deployment image 200, then the container 114 may be restarted 910, either before or after configuring the container 114 according to a desired configuration of the subject deployment image 200. For example, some or all of the following may be changed: container identifier, application instance identifier, environmental variables, establishing any relationships with other components (network, sessions, encrypted connection, etc.), or any other configuration changes. Where multiple exact matches are found 908, a host may be selected in a round robin fashion or based on some other selection criteria such as performance. Where multiple exact matching containers 114 are found 908 on a single host, a matching container 114 may be selected in a round robin fashion or based on some other selection criteria such as performance.

If an exact matching candidate host is not found 908, the method 900 may include searching 912 for a partial match. For example, the installation fingerprint database 300 and/or worker pool may be searched to identify hosts having suspended containers 114 that were instantiated from a container image 204 corresponding to the fingerprint 210. In some implementations, modification of an instantiated container 114 is not permitted such that only exact matches of the container fingerprint 210 constitute a partial match. Alternatively, a first container image 204 that includes the same layers 204*a*-204*c* as a second container image 204 may still be considered a partial match even if the first container image includes one more additional layers.

In other embodiments, modification after instantiation is permitted such that a partial match may include matching fingerprints 210*a*-210*c* for less than all of the layers 204*a*-204*c* of the container image 204 of the subject deployment image 200. In such embodiments, step 912 may include searching for the best partial match, i.e., the candidate host having the greatest amount of data from the deployment image 200.

If a partial match is not found 914, the method 900 may include instantiating 916 the subject deployment image 200 on a non-matching host of the candidate hosts by transmitting the entire subject deployment image 200 to the non-matching host and instantiating the subject deployment image 200 on the non-matching host. Transmitting the entire subject deployment image 200 to the candidate host may include transmitting the entire subject deployment image 200 to the candidate host over a network, which introduces a network delay. The method 900 may further include updating 918 the installation fingerprint database 300 to include an entry associating the candidate host with the fingerprint 206, including all constituent fingerprints 208, 210, 210*a*-210*c* of the fingerprint 206.

If a partial match is found 914, the method 900 may then include restarting 920 the matching (or closest matching) container 114 on a selected host of one or more candidate hosts identified at step 912. Where multiple partial matches are found, the selected host may be selected in a round robin fashion or based on some other criteria such as performance. Where multiple suspended containers 114 on the same host match the container image 204, one of these containers 114 may be selected, such as in a round robin fashion, or based on some other criteria. Where a container 114 can be modified after instantiation, the best partial match as identified at step 912 may be used as the selected host. Likewise, the best match of multiple containers 114 on the same host may be restarted 920.

When the container 114 restarts and invokes the entrypoint of the container 114, the orchestrator 106 may cause the application image 202 of the deployment image 200 (and possibly one or more layers 204*a*-204*c* of the container image 204) to be transmitted 922 to the container 114, which loads the application image 202 as the application instance 118 of the container 114 (and possibly adds the one or more layers 204*a*-204*c* to the container 114) and invokes the entry point 710 of the application instance 118. Steps 920 and 922 may be implemented as part of the method 1000*b* described below with respect to FIG. 10B. The method 900 may then include updating 918 the installation fingerprint database 300 to include an entry associating the selected host with the fingerprint 206 of the deployment image 200, including all constituent fingerprints 208, 210, 210*a*-210*c* of the fingerprint 206.

Figure 10A:
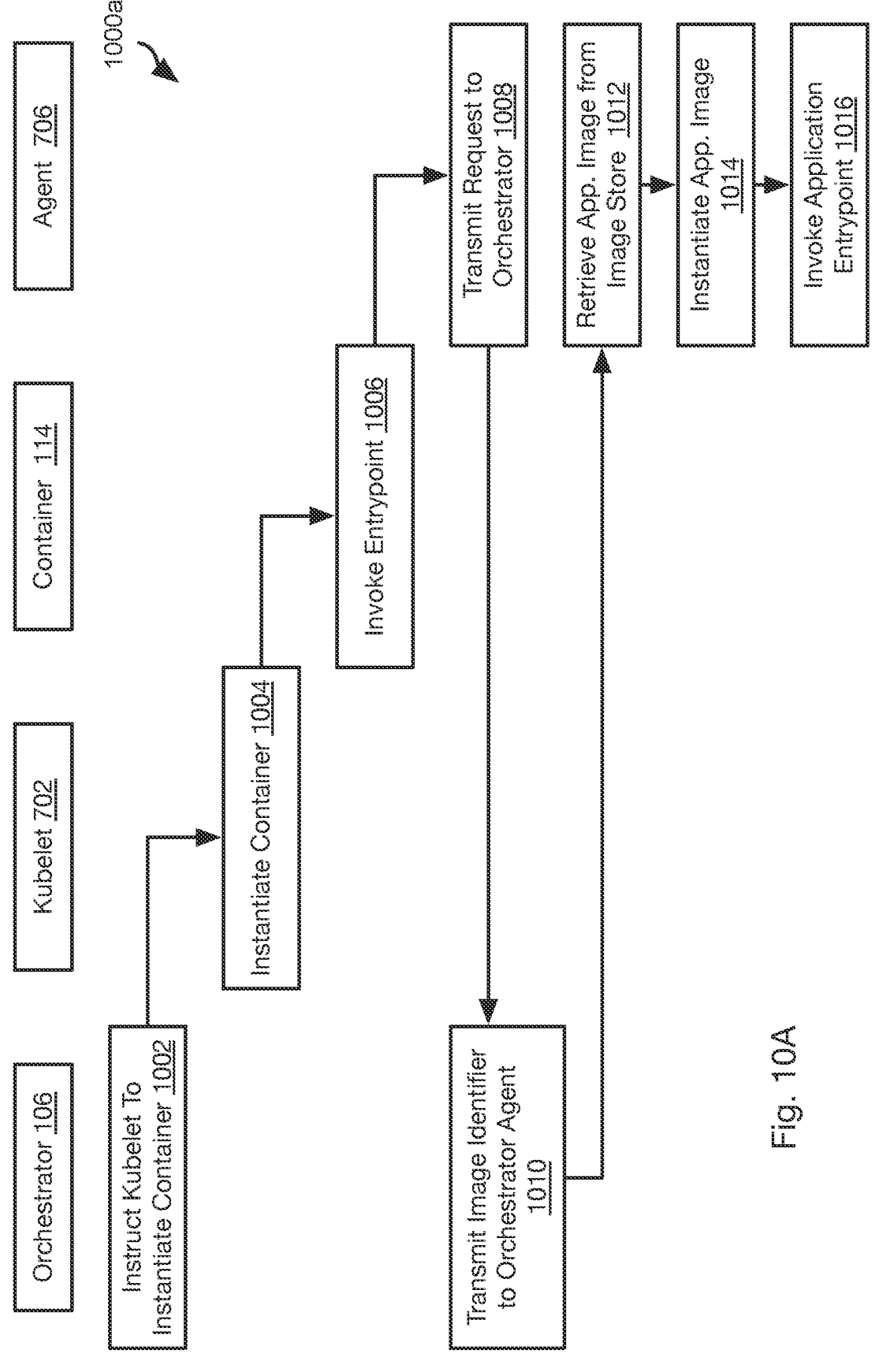
FIG. 10A is a process flow diagram of a method for deploying container and application images in accordance with an embodiment.

FIG. 10A illustrates a method 1000*a* for instantiating a deployment image 200 on a host 700 without using a previously-instantiated container 114. The method 1000*a* may include the orchestrator 106 instructing 1002 a Kubelet 702 to instantiate a container 114. In the description herein, actions ascribed to the Kubelet 702 may be performed by the orchestrator agent 706 or other component on the host 700.

In response, the Kubelet 702, instantiates 1004 the container 114, such as by loading a container image 204 into memory on the host 700 and possibly performing other actions to configure the container 114 and enable the container 114 to execute on the host 700. The Kubelet 702 commences execution of the container 114. Upon commencing execution, the container 114 will invoke 1006 the entrypoint referenced by the entrypoint identifier 708 with which the container 114 is configured, which may be the orchestrator agent 706. In response to being invoked by the container 114, the orchestrator agent 706 transmits 1008 a request to the orchestrator 106 for an identifier of the application image 202 to be loaded into the container 114.

The orchestrator 106 may respond to the request from the orchestrator agent 706 by transmitting 1010 an identifier of the application image 202 to be loaded into the container and the orchestrator agent 706 retrieves 1012 the application image 202 corresponding to the identifier from the image store 126. In some embodiments, the orchestrator 106 itself will transmit the application image 202 in response to the request from the orchestrator agent 706.

The orchestrator agent 706 instantiates 1014 the application image 202 as the application instance 118 within the container 114 and invokes 1016 the entry point of the application instance 118 in order to commence execution of the application instance 118. The orchestrator agent 706 may also make any desired configuration changes to the container 114 and/or application instance 118 either before or after invoking 1016 the entry point of the application instance 118.

Figure 10B:
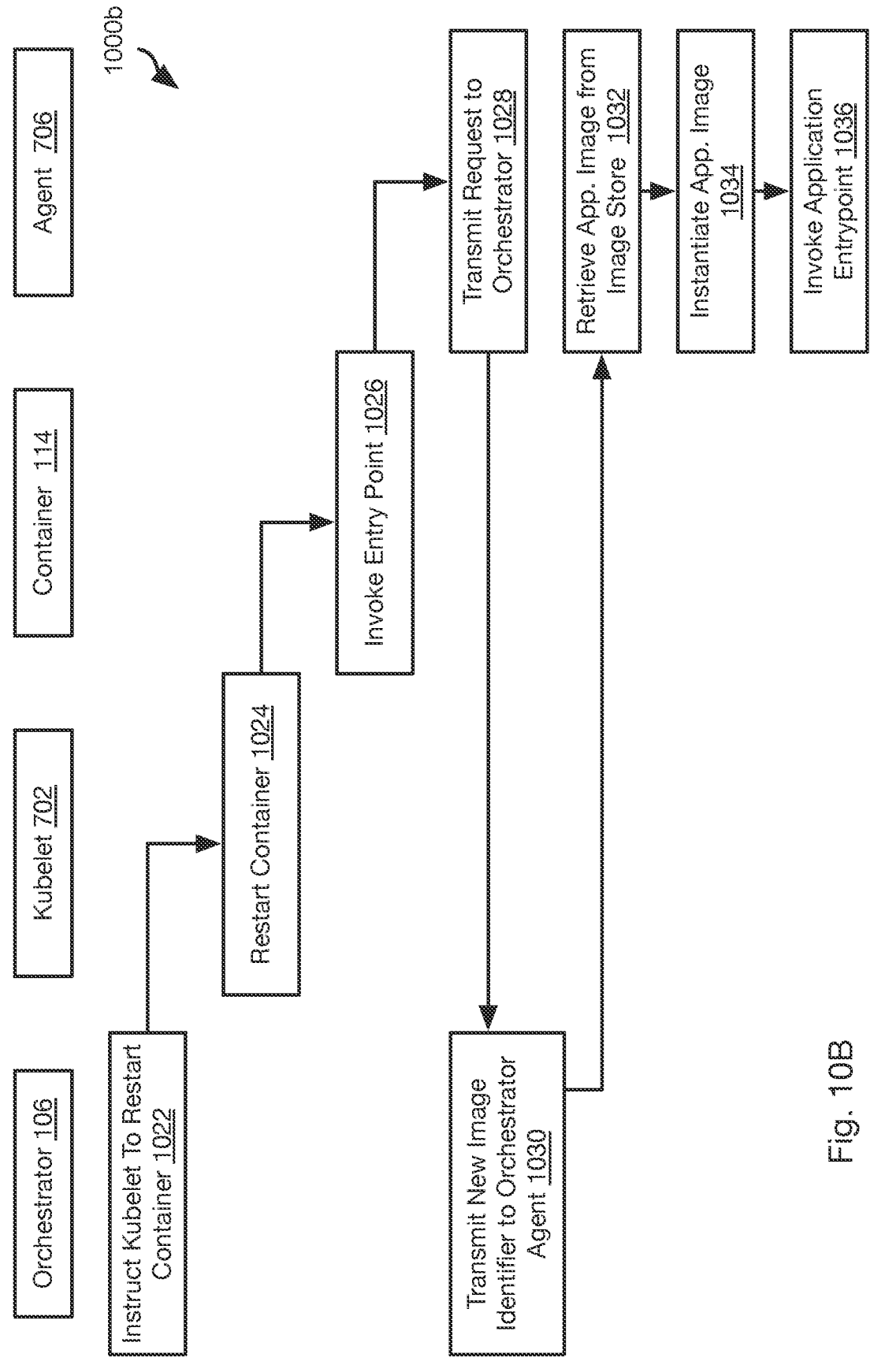
FIG. 10B is a process flow diagram of a method for deploying a new application image to a running container in accordance with an embodiment.

FIG. 10B illustrates a method 1000*b* for instantiating the application image 202 of a deployment image 200 on a host 700 using a previously-instantiated container 114. The method 1000*b* may include the orchestrator 106 instructing 1022 a Kubelet 702 to restart the container 114.

In response, the Kubelet 702, restarts 1024 the container 114. Upon commencing execution, the container 114 will invoke 1026 the entrypoint referenced by the entrypoint identifier 708 with which the container 114 is configured, which may be the orchestrator agent 706. In response to being invoked by the container 114, the orchestrator agent 706 transmits 1028 a request to the orchestrator 106 for an identifier of the application image 202 to be loaded into the container 114.

The orchestrator 106 may respond to the request from the orchestrator agent 706 by transmitting 1030 an identifier of the application image 202 and the orchestrator agent 706 retrieves 1032 the application image 202 corresponding to the identifier from the image store 126. In some embodiments, the orchestrator 106 itself will transmit the application image 202 in response to the request from the orchestrator agent 706.

The orchestrator agent 706 instantiates 1034 the application image 202 as the application instance 118 within the container 114 and invokes 1036 the entry point of the application instance 118 in order to commence execution of the application instance 118. The orchestrator agent 706 may also make any desired configuration changes to the container 114 and/or application instance 118 either before or after invoking 1036 the entry point of the application instance 118.

Figure 11:
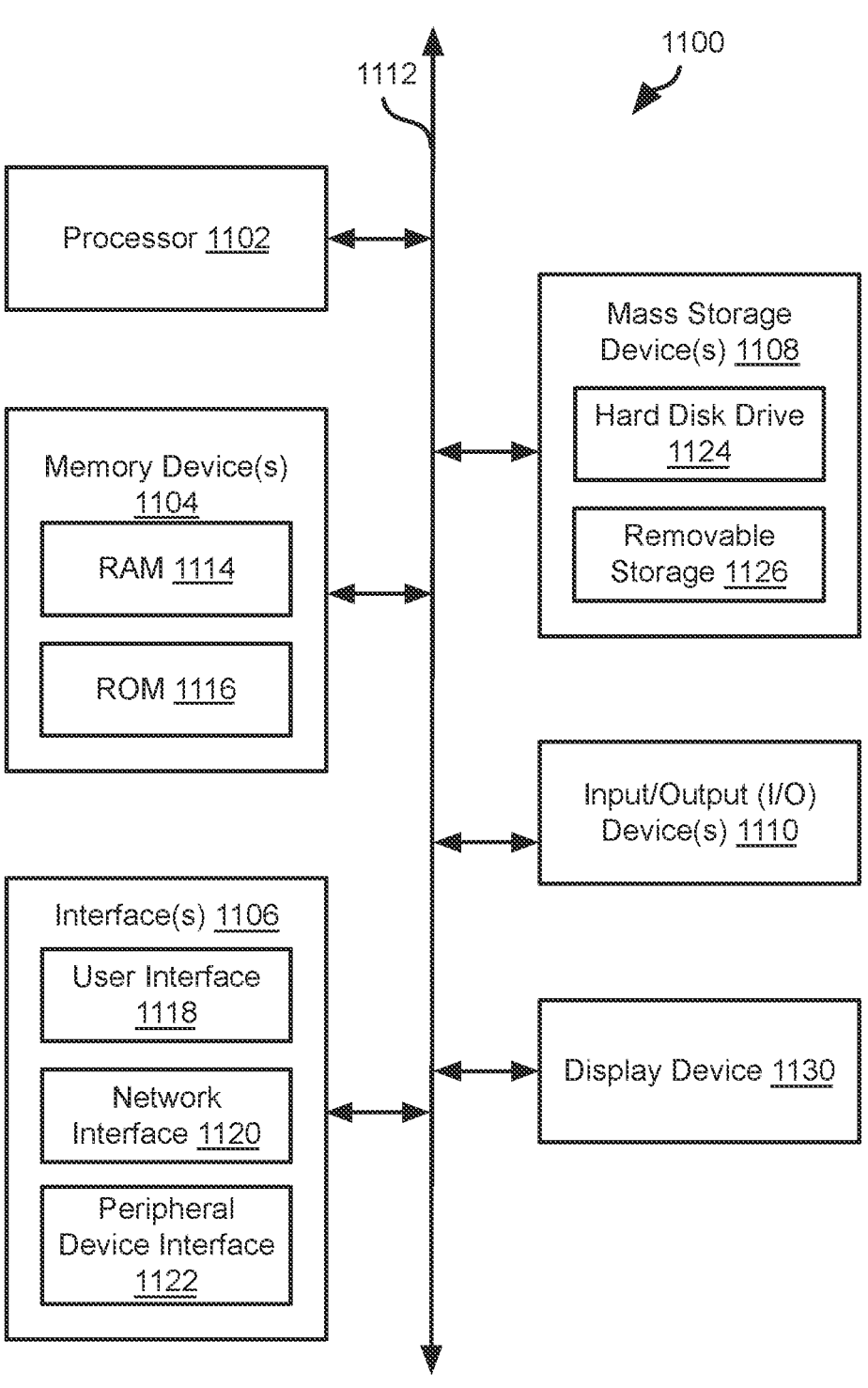
FIG. 11 is a schematic block diagram of an example computing device suitable for implementing methods in accordance with embodiments of the invention.

FIG. 11 is a block diagram illustrating an example computing device 1100. Computing device 1100 may be used to perform various procedures, such as those discussed herein. The servers 102, orchestrator 106, workflow orchestrator 122, fingerprint processor 128, and cloud computing platform 104 may each be implemented using one or more computing devices 1100. The orchestrator 106, workflow orchestrator 122, and fingerprint processor 130 may be implemented on different computing devices 1100 or a single computing device 1100 may host two or more of the orchestrator 106, workflow orchestrator 122, and fingerprint processor 130.

Computing device 1100 includes one or more processor(s) 1102, one or more memory device(s) 1104, one or more interface(s) 1106, one or more mass storage device(s) 1108, one or more Input/output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, I/O device(s) 1110, and display device 1130 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer.

Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. An apparatus comprising:
a computing device including one or more processing devices and one or more memory devices operably coupled to the one or more processing devices, the one or more memory devices storing executable code that, when executed by the one or more processing devices, causes the one or more processing devices to:
receive a request over a network to instantiate a deployment image, the deployment image having a fingerprint associated therewith;
identify a host in a fingerprint database having an association between a first portion of the fingerprint and the host, the association between the first portion of the fingerprint and the host indicating that a first portion of the deployment image is located on the host, the host being remote from the apparatus, the first portion of the fingerprint corresponding to a the first portion of the deployment image; and
in response to identifying the host in the fingerprint database having the association between the first portion of the fingerprint and the host, invoke instantiation of the deployment image on the host over the network by transmitting only a second portion of the deployment image other than the first portion of the deployment image to the host over the network for instantiation of the deployment image on the host.

2. The apparatus of claim 1, wherein the executable code, when executed by the one or more processing devices, further causes the one or more processing devices to instantiate the deployment image on the host by:
determining that the host has all of the fingerprint associated therewith; and
in response to determining that the host has all of the fingerprint associated therewith, invoking instantiation of the deployment image on the host from a copy of the deployment image local to the host.

3. The apparatus of claim 1, wherein the executable code, when executed by the one or more processing devices, further causes the one or more processing devices to instantiate the deployment image on the host by:
determining that the host does not have a second portion of the fingerprint associated therewith; and
in response to determining that the host does not have the second portion of the fingerprint associated therewith, transmitting a-the second portion of the deployment image to the host, the second portion being associated with the second portion of the fingerprint.

4. The apparatus of claim 3, wherein the first portion of the deployment image is a container image and the second portion of the deployment image is an application image.

5. The apparatus of claim 3, wherein the first portion of the deployment image is one or more first layers of a container image and the second portion of the deployment image is one or more second layers of the container image.

6. The apparatus of claim 1, wherein the executable code, when executed by the one or more processing devices, further causes the one or more processing devices to identify the host having the at least the first portion of the fingerprint associated therewith by:

selecting the host from among one or more hosts having hardware resources sufficient to instantiate the deployment image.

7. The apparatus of claim 1, wherein the executable code, when executed by the one or more processing devices, further causes the one or more processing devices to identify the host having the at least the first portion of the fingerprint associated therewith by:

selecting the host from among one or more hosts having attributes required for instantiation of the deployment image.

8. A method comprising:

receiving, by a computer system, over a network, a request to instantiate a deployment image, the deployment image having a fingerprint associated therewith;

identifying, by the computer system, a host in a fingerprint database having an association between a first portion of the fingerprint and the host, the association between the first portion of the fingerprint and the host indicating that a first portion of the deployment image is located on the host, the host being remote from the computer system, the first portion of the fingerprint corresponding to the first portion of the deployment image; and in response to identifying the host in the fingerprint database having the association between the first portion of the fingerprint and the host, invoke instantiation of the deployment image on the host over the network by transmitting a second portion of the deployment image other than the first portion of the deployment image to the host over the network for instantiation of the deployment image on the host.

9. The method of claim 8, wherein instantiating the deployment image on the host comprises:

determining that the host has all of the fingerprint associated therewith; and in response to determining that the host has all of the fingerprint associated therewith, invoking instantiation of the deployment image on the host from a copy of the deployment image local to the host.

10. The method of claim 8, wherein instantiating the deployment image on the host comprises:

determining that the host does not have a second portion of the fingerprint associated therewith; and in response to determining that the host does not have the second portion of the fingerprint associated therewith, transmitting the second portion of the deployment image to the host, the second portion being associated with the second portion of the fingerprint.

11. The method of claim 10, wherein the first portion of the deployment image is a container image and the second portion of the deployment image is an application image.

12. The method of claim 10, wherein the first portion of the deployment image is one or more first layers of a container image and the second portion of the deployment image is one or more second layers of the container image.

13. The method of claim 8, wherein identifying the host having the at least the first portion of the fingerprint associated therewith comprises selecting the host from among one or more hosts having hardware resources sufficient to instantiate the deployment image.

14. The method of claim 8, wherein identifying the host having the at least the first portion of the fingerprint associated therewith comprises selecting the host from among one or more hosts having attributes required for instantiation of the deployment image.

* * * * *